US006850417B2

United States Patent
Cooper et al.

(10) Patent No.: US 6,850,417 B2
(45) Date of Patent: Feb. 1, 2005

(54) INTEGRATED EXPANSION CARD SLOT STATUS INDICATOR AND POWER ACTUATOR

(75) Inventors: Brently L. Cooper, Hutto, TX (US); Russell C. Smith, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 723 days.

(21) Appl. No.: 09/907,291

(22) Filed: Jul. 17, 2001

(65) Prior Publication Data

US 2003/0018843 A1 Jan. 23, 2003

(51) Int. Cl.[7] .................................................. H05K 5/06
(52) U.S. Cl. ........................ 361/752; 361/685; 361/686; 710/302; 713/340
(58) Field of Search ............................... 361/752, 797, 361/800, 685, 686, 683, 755; 710/302; 713/340; 439/327

(56) References Cited

U.S. PATENT DOCUMENTS

| | | | |
|---|---|---|---|
| 4,596,907 A | 6/1986 | LaGreco et al. | 200/50 |
| 5,428,507 A | 6/1995 | Chatel et al. | 361/798 |
| 5,568,610 A | 10/1996 | Brown | 395/185.01 |
| 5,579,491 A | 11/1996 | Jeffries et al. | 395/283 |
| 5,601,349 A | 2/1997 | Holt | 312/265.6 |
| 5,664,119 A | 9/1997 | Jeffries et al. | 395/283 |
| 5,692,219 A | 11/1997 | Chan et al. | 395/869 |
| 5,822,196 A | 10/1998 | Hastings et al. | 361/801 |
| 6,069,796 A * | 5/2000 | Hastings et al. | 361/754 |
| 6,125,417 A | 9/2000 | Bailis et al. | 710/103 |
| 6,138,194 A * | 10/2000 | Klein et al. | 710/302 |
| 6,181,565 B1 | 1/2001 | Schmitt et al. | 361/756 |
| 6,182,173 B1 | 1/2001 | Grosser et al. | 710/103 |
| 6,215,668 B1 | 4/2001 | Hass et al. | 361/759 |
| 6,215,673 B1 | 4/2001 | Gordon et al. | 361/801 |
| 6,286,066 B1 | 9/2001 | Hayes et al. | 710/103 |
| 2002/0081890 A1 * | 6/2002 | Obermaier | 439/377 |

OTHER PUBLICATIONS

"Hot Plug Receptacle Actuated Mechanical Latch," *IBM Technical Disclosure Bulletin*, vol. 34, No. 6, pp. 363–364, (Nov. 1991).

* cited by examiner

Primary Examiner—Kamand Cuneo
Assistant Examiner—Hung S. Bui
(74) Attorney, Agent, or Firm—Baker Botts L.L.P.

(57) ABSTRACT

A computer system having a computer housing, a printed circuit board within the housing having at least one connector for receiving an expansion card, a power control switch for controlling power to the connector, and an actuator device that is movably coupled to the printed circuit board so that movement of the actuator relative to the printed circuit board causes the actuator to activate the power control switch. The actuator is further capable of transmitting light emitted from a connector status indicator on the printed circuit board from a first point along the length of the actuator to a second point along its length.

24 Claims, 7 Drawing Sheets

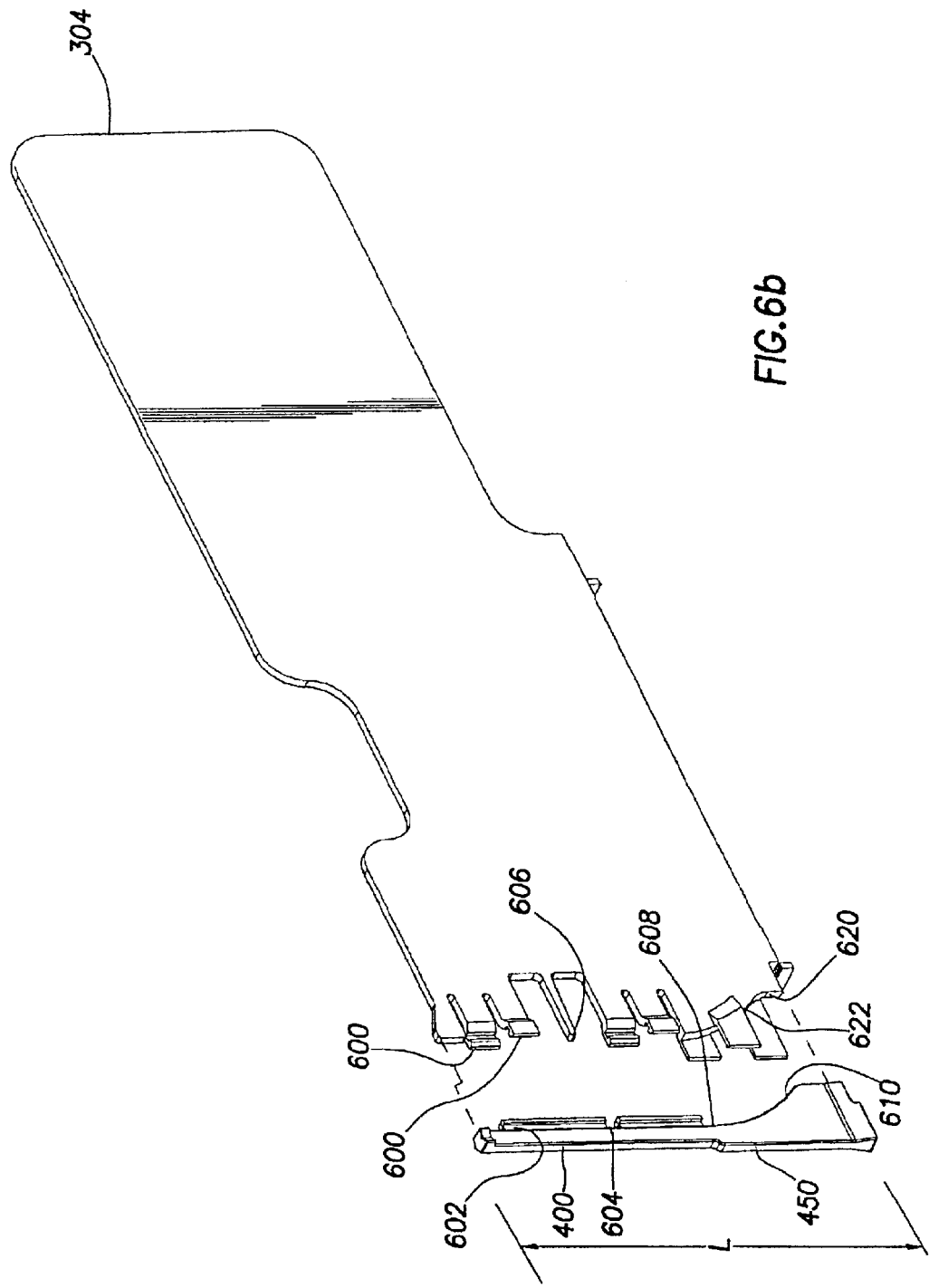

US 6,850,417 B2

INTEGRATED EXPANSION CARD SLOT STATUS INDICATOR AND POWER ACTUATOR

TECHNICAL FIELD

This invention relates in general to the field of computers, and more particularly, to a system and method for indicating the status of an expansion card connector, and for controlling power to the connector.

BACKGROUND

Computer systems typically include multiple peripheral devices coupled to the system via communication buses. Often these peripherals are coupled to buses through expansion cards (also known as adapter cards) that plug into expansion card connectors (or slots) on the motherboard. The communication buses are generally fault-intolerant, so that failure or aberrations at the expansion card or expansion card connector may adversely affect the ability of the communication bus to effectively transmit data. A common cause of such failure in a computer system is the insertion into or removal of an expansion card from a connector when that connector is powered and running. In an effort to prevent these types of problems, some standards and specification have been developed. For example, the PCI (Peripheral Communication Interface) "Hot Plug" specification governs insertion into and removal of expansion cards from communication buses while the computer system is running. Since expansion cards are generally not designed to be inserted in a powered connector, the specification defines a sequence of user actions and system behavior to ensure that power is removed from the connector before the expansion card is inserted. This specification requires slot specific power switches to control power to each slot, and often such power switches are physical switches that can be manually activated to turn power to the slot on or off. The specification further suggests the use of slot state indicators, such as LEDs, to indicate to a user whether the connector is powered on or off (the power state of the connector), and the error status of the slot. Many prior art systems utilize both a physical power switch and an LED slot state indicator for each connector.

In any system having such an LED indicator and power switch associated with a connector, it is important to make these devices readily accessible to a user. A system that requires removal of computer system covers or access panels to view the LED is undesirable, as is a system having a power switch that is difficult to access. Many prior art systems have addressed these concerns by placing the LED indicators and power switches for each card slot on a separate printed circuit board that is electrically coupled to the motherboard. This separate printed circuit board is mounted inside the back side of the computer housing in such a way that at least the LED indicator is visible from the outside of the computer housing through an aperture or the like in the computer housing. In this manner, a user can determine the status of a card slot without removing the computer housing. In some systems, the power switches are also accessible in this way.

Drawbacks of the above described prior art systems include the increased cost of having a separate printed circuit board containing LED indicators (or any other indicator that conveys the power status of the connector) and possibly power switches, in addition, the difficulty in electrically coupling this separate printed circuit board to each expansion connector. Systems having these additional components also inherently have more modes of failure.

Other prior art systems have used translucent devices to transfer light emitted from an LED on the printed circuit board to a point near the top of a protective divider that separates successive expansion card connectors and expansion cards. In these known devices, however, light is not visible from an exterior of the computer housing. Thus, the housing must be removed, or partially removed, to view the LED and to access the power switch.

It would be advantageous to provide a simplified system and method for indicating to a user the power status of an expansion card connector and for controlling power to that connector.

SUMMARY

In accordance with the present disclosure, a computer system is provided including a computer housing, and a printed circuit board positioned within the computer housing that has at least one connector adapted to receive an expansion card, and having a power control device mounted thereon and electrically coupled to the connector for turning on and off power to the connector. The computer system further includes an actuator that is movably coupled to the printed circuit board so that movement of the actuator relative to the printed circuit board activates the power control device. The actuator is further capable of transmitting light from a first point along the length of the actuator to a second point along its length.

According to another embodiment, the computer system further includes a connector status indicator mounted on the printed circuit board that is capable of illuminating to indicate the status of the connector.

According to yet another embodiment, when illuminated, light emitted from the connector status indicator is transmitted from the first point along the length of the actuator to the second point along its length.

In yet another embodiment, the computer system further includes a divider member removably coupled to the printed circuit board and positioned substantially adjacent to the connector, with the actuator movably coupled to the divider member.

In yet another embodiment, a first end of the actuator is positioned substantially adjacent to the power control device and the connector status indicator.

According to yet another embodiment, light transmitted to the second point along the length of the actuator is visible from the exterior of the computer housing through an aperture therein.

A method is also provided for determining the status of an expansion card connector on a printed circuit board and for controlling power to the expansion card connector. The method includes the steps of movably coupling an actuator to a printed circuit board within a computer housing of a computer system, positioning a first end of the actuator substantially adjacent to a power control device that controls power to the connector, so that movement of the actuator relative to the printed circuit board causes the first end to engage and activate the power control device. The method further includes the steps of positioning the first end of the actuator substantially adjacent to a connector status indicator that emits light to indicate a status of the connector so that light emitted from the connector status indicator illuminates the first end, and transmitting the light illuminating the first end of the actuator to a second point along the length of the actuator. According to one embodiment, the method further includes the step of viewing the light transmitted to the second point along the length of the actuator from an exterior of the computer housing through an aperture in the computer housing.

According to another embodiment, the method further includes the steps of positioning a divider member substantially adjacent and substantially parallel to the expansion card connector, and movably coupling the actuator to the divider member.

Also provided is an actuator for controlling power to an expansion card connector on a printed circuit board, and for indicating a status of the expansion card connector. The actuator includes a first end of sufficient dimension to extend substantially adjacent to both a power control device mounted on the printed circuit board for controlling power to the expansion card connector, and to a connector status indicator mounted on the printed circuit board for indicating the status of the connector. The actuator further includes a second end and a first side edge having a curved portion for reflecting light illuminating the first end toward a second point along the length of the actuator, and a second side edge wherein light transmitted to the second point along the length of the actuator is visible through the second side edge.

Finally, a computer system is provided having a computer housing, a printed circuit board located within the housing having at least one connector adapted to receive an expansion card, and a power control device mounted on the printed circuit board and electrically coupled to the connector for turning on and off power to the connector. The computer system further includes a divider member positioned within the computer housing substantially adjacent and substantially parallel to the connector, and an actuator device movably coupled to the divider member. A first end of the actuator is positioned substantially adjacent to the power control device so that when pressure is applied to a second end of the actuator, the actuator moves relative to the divider member and engages and activates the power control device. The actuator is further capable of transmitting light from a first point along a length of the actuator to a second point along its length.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 6b is an exploded view of FIG. 6a; and

DETAILED DESCRIPTION

Preferred embodiments of the present invention are illustrated in the Figures, like numeral being used to refer to like and corresponding parts of the various drawings.

Figure 1:
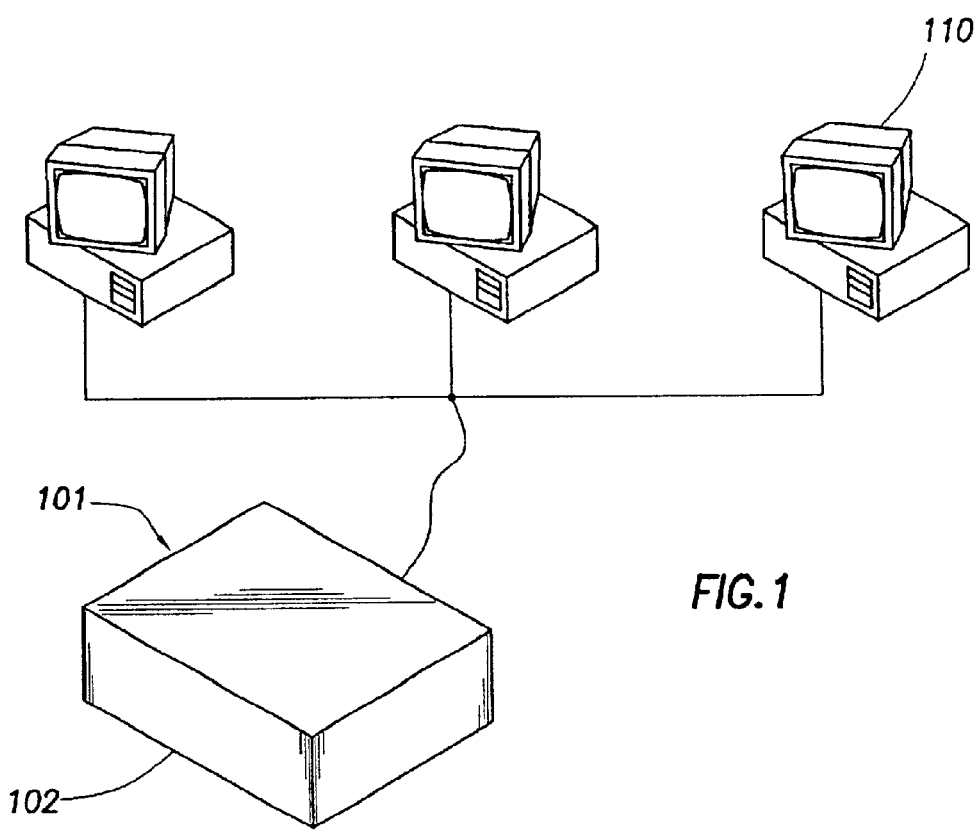
FIG. 1 illustrates one embodiment of a typical computer system.

Referring now to FIG. 1, a computer system 101 generally includes a central processing unit (CPU), memory, and various other electronic components that reside within a computer housing 102, and also one or more peripheral devices. The computer system may be a server that is electrically coupled to one or more user terminals 110 (as shown), may be part of a desktop computer system, or a part of any other system architecture.

Figure 2:
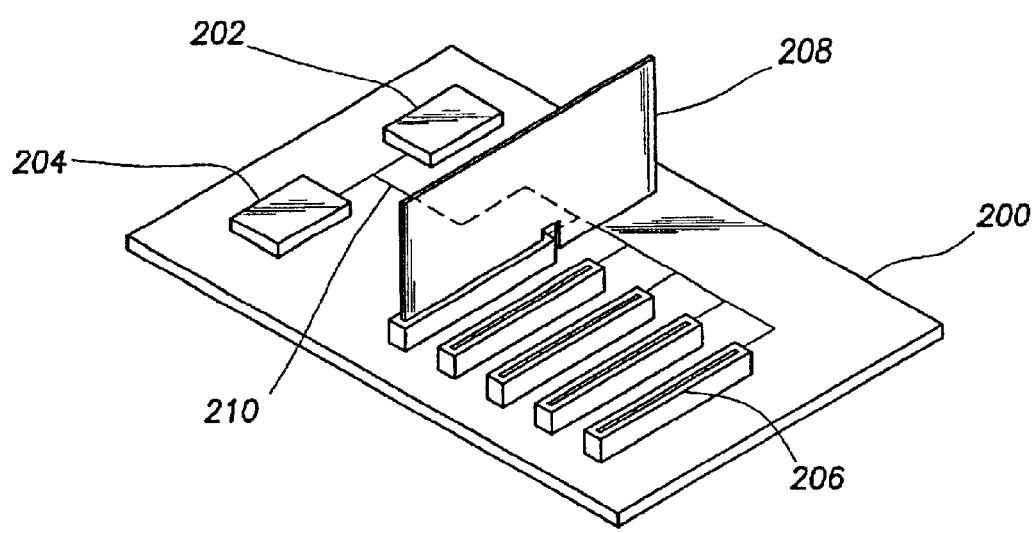
FIG. 2 illustrates generally a printed circuit board having expansion card connectors.

Referring now to FIG. 2, the CPU 202 and memory 204 are typically mounted on a printed circuit board 200 (also known as a motherboard), and electrically coupled to one another. Various other conventional and well known elements (not shown) are also mounted on the printed circuit board and electrically coupled to one another. The printed circuit board illustrated in FIG. 2 also includes one or more expansion card connectors 206 (or slots) each capable of receiving an expansion card 208. Processor 202 communicates with expansion cards positioned in the expansion card connectors via communication bus 210, such as a PCI bus.

Figure 3:
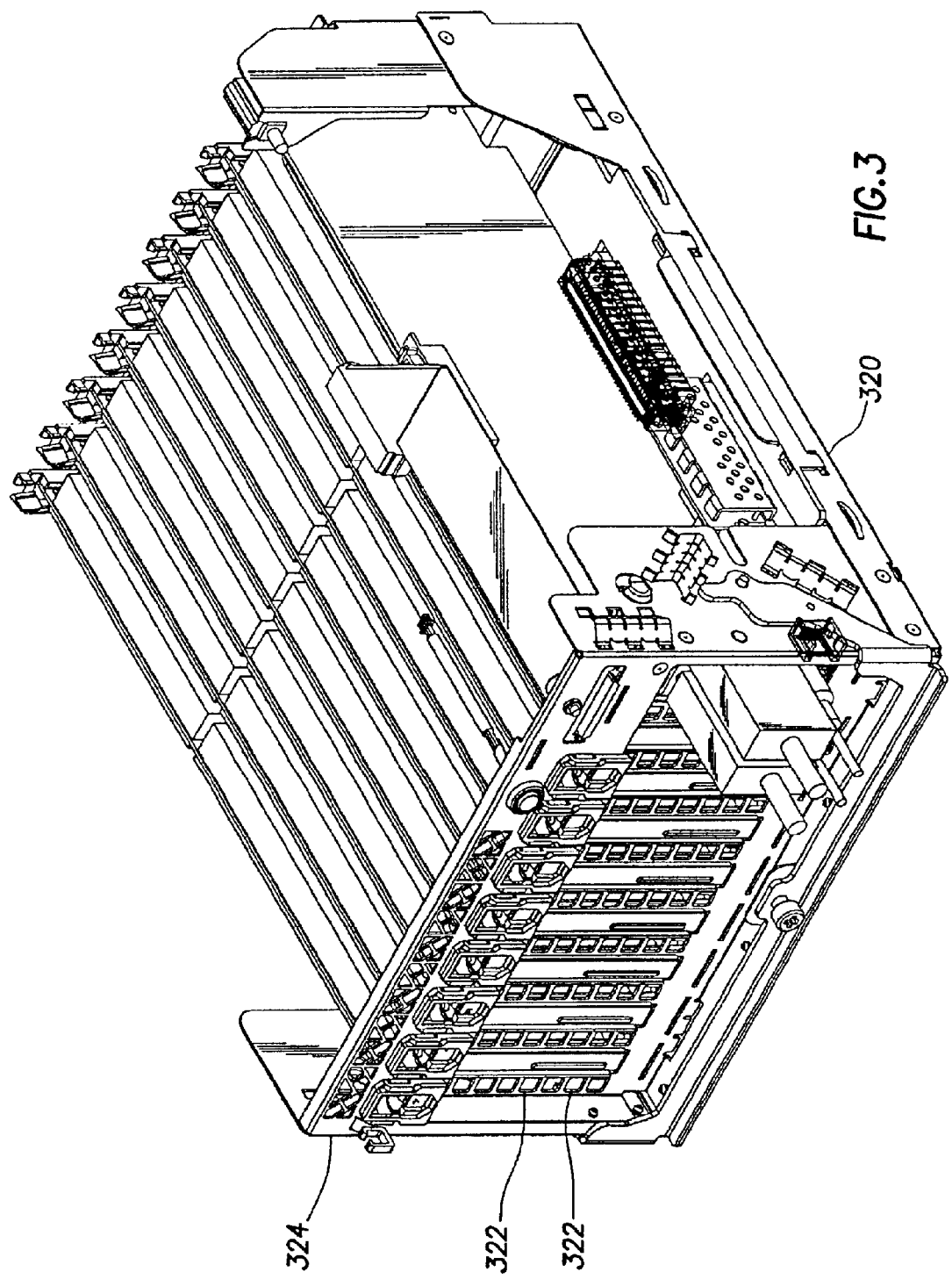
FIG. 3 illustrates an interior portion of a computer system according to one embodiment of the present disclosure.
Figure 4:
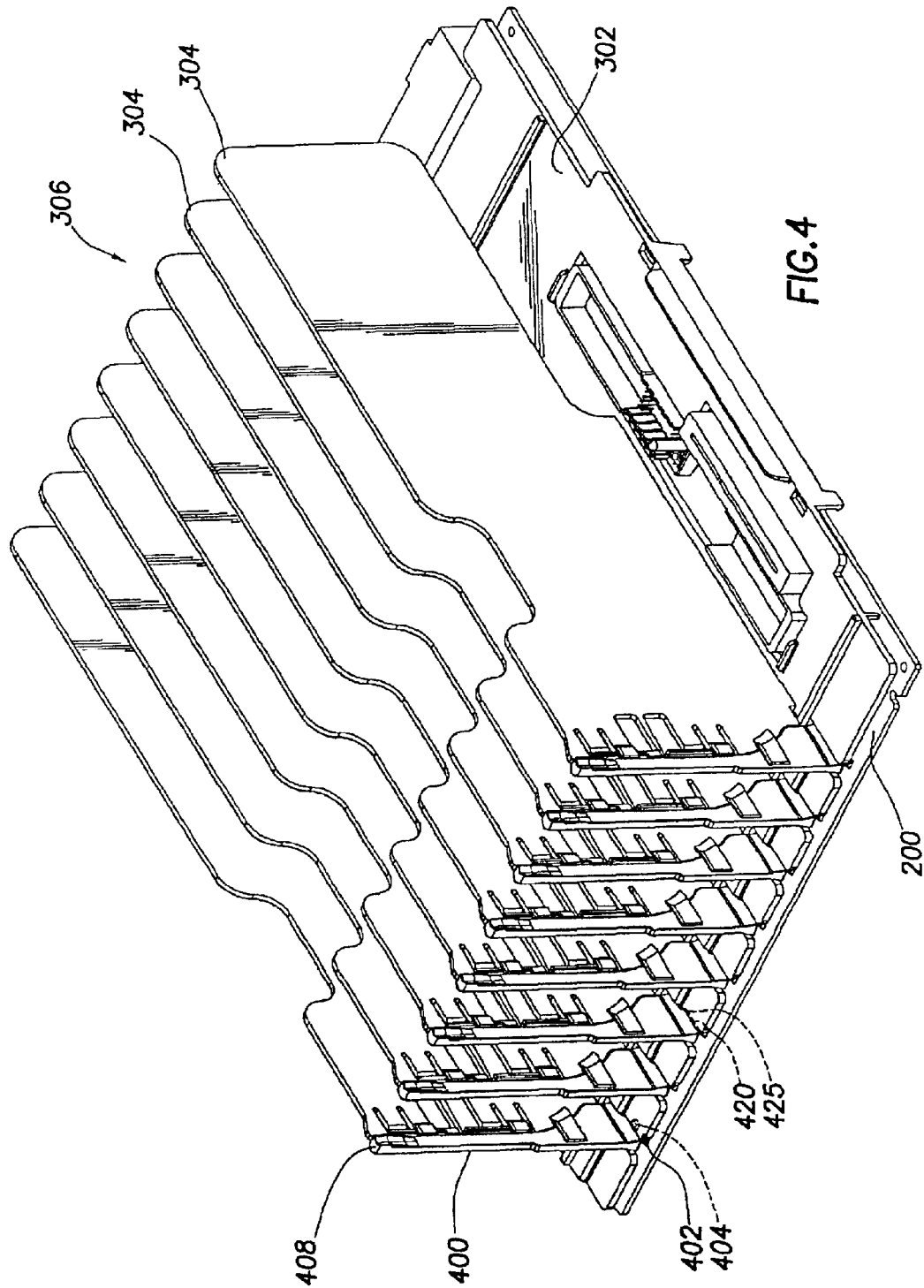
FIG. 4 is an isometric view of a printed circuit board and actuators according to one embodiment of the present disclosure.
Figure 7:
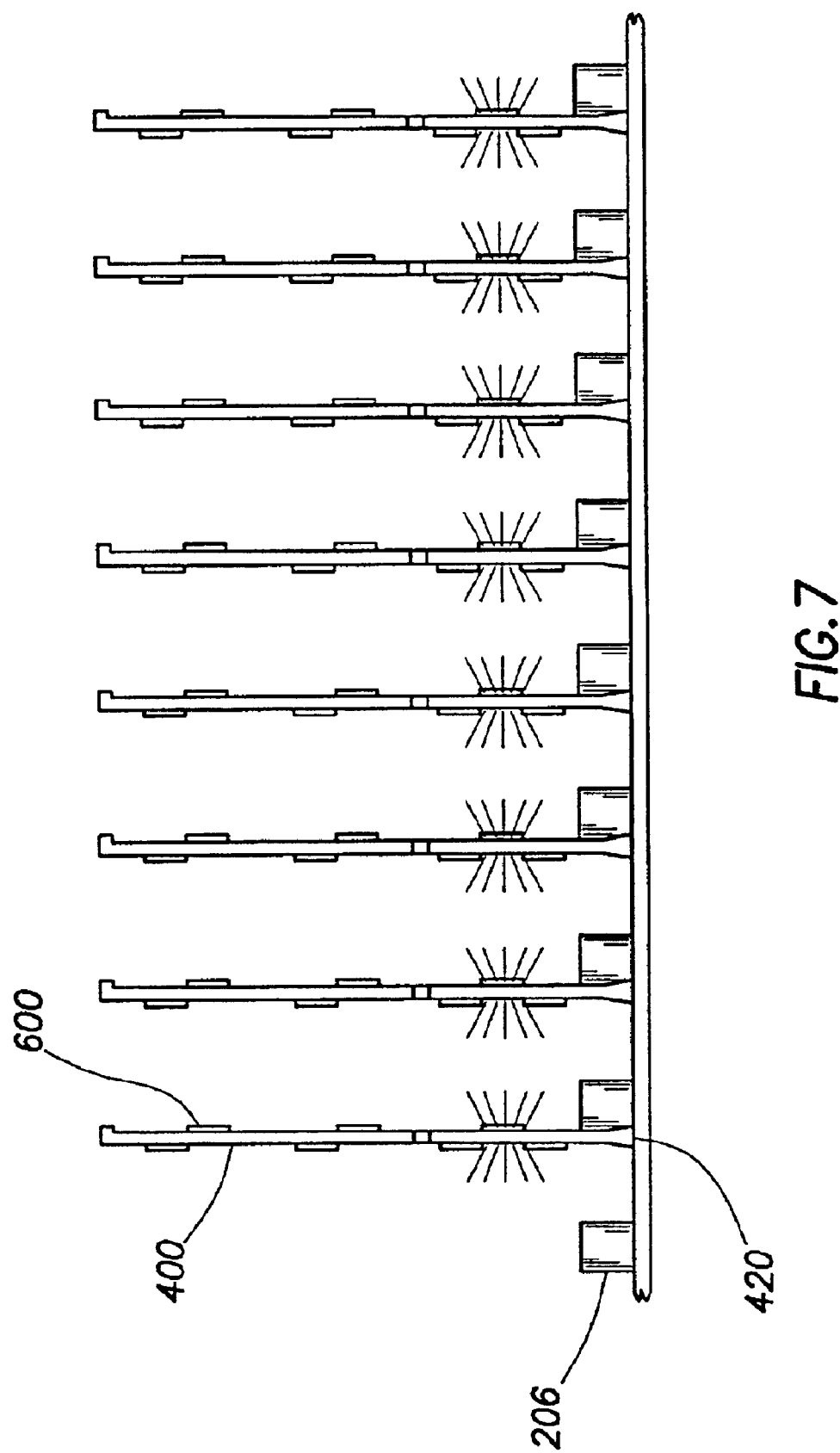
FIG. 7 is a back view of a printed circuit board and actuators according to one embodiment of the present disclosure.

Referring now to FIGS. 3 and 4, the printed circuit board 200 is secured within the computer housing by any suitable means, and in the described embodiment is positioned substantially adjacent to a bottom side 320 of the computer housing. For each of the expansion card connectors 206 on the printed circuit board (see FIG. 7), a corresponding connector status indicator 404 and a power control device or switch 402 is mounted on the motherboard, as shown in FIG. 4. The power control device 402 is electrically coupled to the corresponding expansion card connector and controls the supply of power to the connector. Thus, activation of the power control device powers on and off the connector. According to one embodiment, exerting pressure on the power control device activates a switch that controls power to the connector. The connector status indicator 404 is electrically coupled to the power control device and/or expansion connector, and indicates the status of the connector, i.e., whether the connector is currently powered or not, and the error or fault status of that connector. Typically, the connector status indicator will include a light, such as an LED, that either illuminates to indicate that the slot is powered, or illuminates differently (different colors) when the slot is powered versus when it is not.

Associated with each expansion card connector is an actuator 400, as shown in FIGS. 4–8. The actuator is of sufficient size and dimension, and positioned so that a first end 420 of the actuator is in proximity to both the power control device and the connector status indicator. The actuator is also movably coupled to the printed circuit board so that movement of the actuator relative to the printed circuit board causes the first end of the actuator to engage and activate the power control device.

Figure 5:
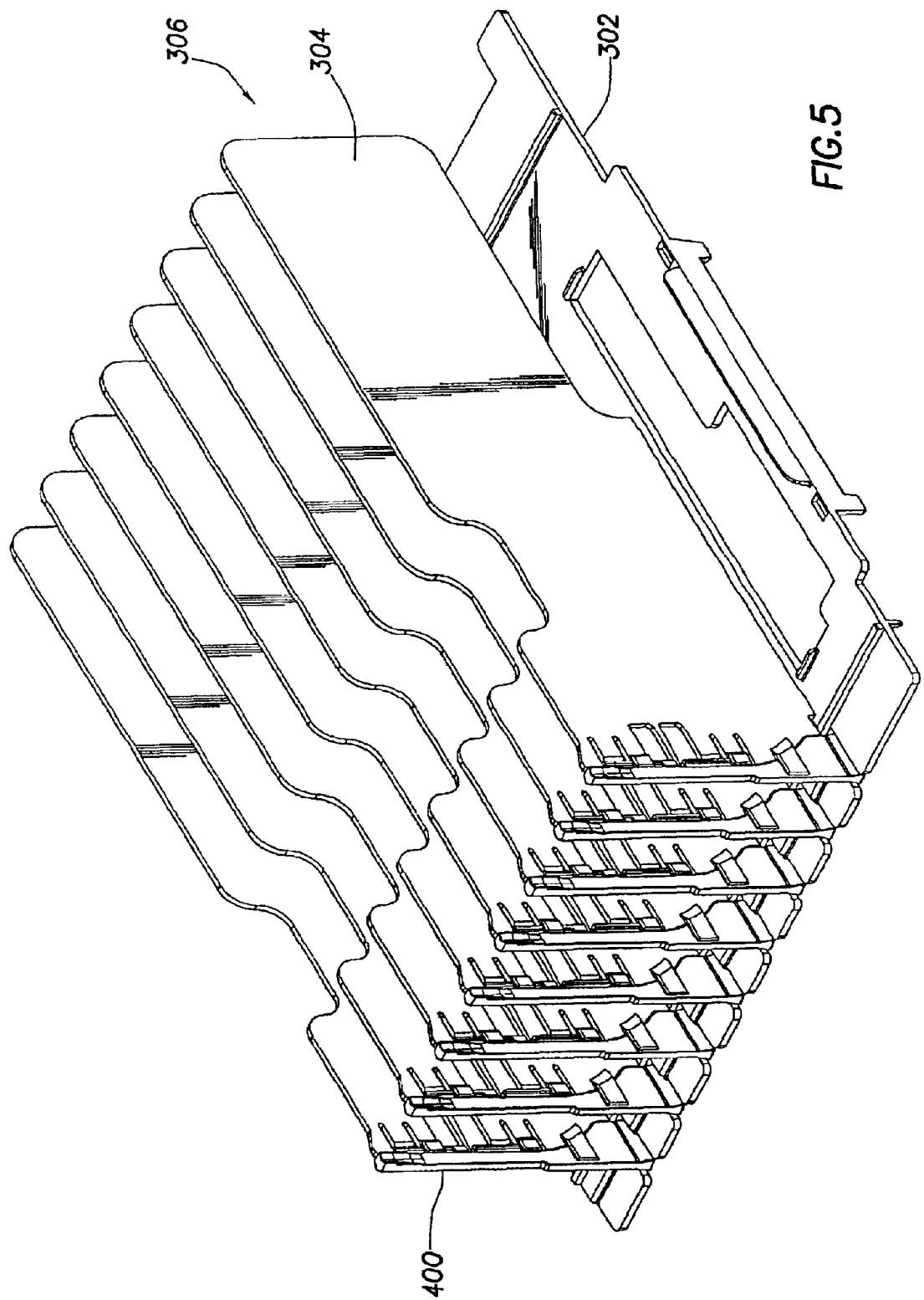
FIG. 5 is an isometric view of a divider assembly having divider members, and actuators according to one embodiment of the present disclosure.

In the illustrated embodiments, movement of the actuator relative to the printed circuit board is accomplished by movably coupling the actuator to a divider assembly 306 that is removably positioned within the computer housing. Referring to FIGS. 4 and 5, the divider assembly includes a base member 302, and at least one divider member 304 to which the actuator is movably coupled. According to one embodiment, the base member is positioned substantially adjacent to and substantially parallel to the printed circuit board so as to substantially cover the printed circuit board. Each divider member is positioned substantially adjacent and substantially parallel to a corresponding expansion card connector, with the expansion card connector being accessible through one or more holes or openings in the base member. In this manner, the divider member does not interfere with an expansion card that is inserted into the expansion card connector, but provides a protective barrier between successive expansion cards. Movement of the actuator relative to the divider member and in a direction toward the power control device is accomplished by applying pressure to the second end 408 of the actuator, as will be discussed more fully below.

Figure 6A:
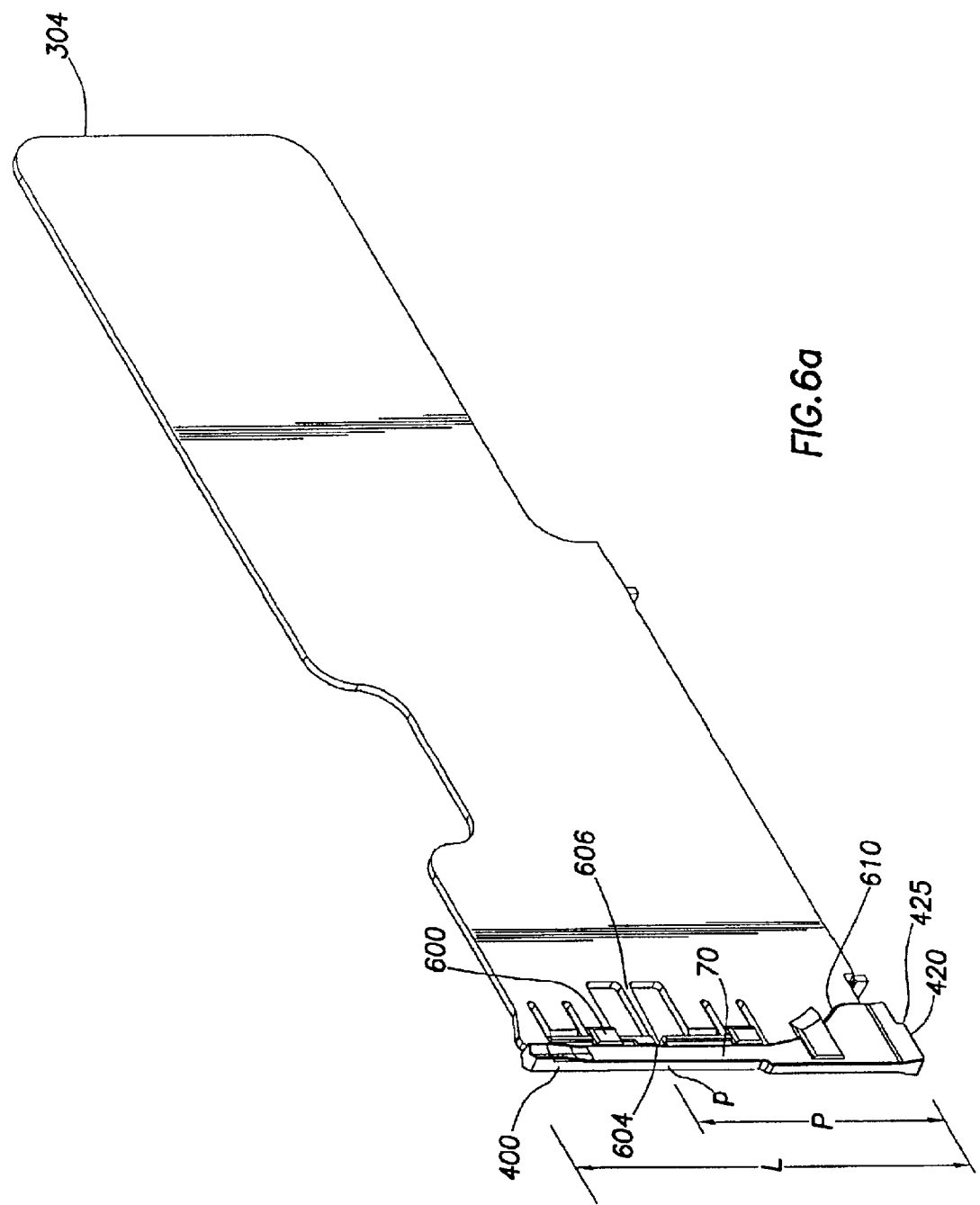
FIG. 6a is an isometric view of a divider member and actuator according to one embodiment of the present disclosure.

As shown in more detail in FIGS. 6*a* and 6*b*, according to one embodiment, the divider member has one or more projections 600 that engage the actuator. Preferably, at least a portion of the length L of the actuator has a ridge or groove 602 therein, and the at least one projection of the divider member is configured so as to engage the ridge or groove, thereby securely grasping the actuator but allowing it to slide relative to the divider member. In addition, the actuator includes at least one notch 604 therein, and the divider member includes at least one finger-like element or projection 606 that projects from the divider member and extends to within the notch in the actuator as shown. When pressure is applied to the second end 408 of the actuator to slidably move the actuator relative to the divider member, the finger-like projection provides a resistive force against such movement. The resistive force is such that a sufficient amount of pressure will cause the actuator to move enough (downwardly in the illustrated embodiment) to actuate the power control device, but when the pressure is removed from the second end of the actuator, the resistive force is sufficient to cause the actuator to move back substantially to its initial position.

The actuator further includes a first side edge 608 having a curved portion 610 and a second side edge 450, and the divider member further includes a first side edge 620 having a curved portion 622 that is substantially complementary to and positioned substantially adjacent to the curved portion of the actuator. Further, the first end of the actuator is also located sufficiently close to the connector status indicator 404 (see FIG. 4) so that light from the connector status indicator illuminates the first end of the actuator. In one embodiment, the actuator is made of a sufficiently translucent material, such as acrylic or other clear polymer, so that light from the connector status indicator that illuminates the first end of the actuator is transmitted at least along a portion P of the length L of the actuator to a second point p. The curved portion of the actuator facilitates transmission of light in this manner by reflecting at least some of the light further along the length of the actuator. This is particularly true when the a non-translucent divider member is substantially complementary to and positioned substantially adjacent to the curved portion of the actuator. This reflected light can be visible along the portion P of the length L through the second side edge 450 of the actuator.

The portion P of the length of the actuator along which light is transmitted in one embodiment is sufficient to enable viewing of the transmitted light from the exterior of the computer housing through an aperture or the like in the computer housing. For example, as illustrated in FIG. 3, computer housing 102 may have a plurality of apertures 322 in the back side 324 of the housing which may, among other things, be used to provide ventilation for the system. Although the actuators cannot be seen in FIG. 3, they are coupled to the respective divider members 304 at the end of the divider closest to the back side of the computer housing, and positioned substantially adjacent to a respective set of apertures 322. The light from the connector status indicator is transmitted from a first point along the length of the actuator (i.e., at the first end), to a second point p along the length of the actuator (distance P) such that it is visible through at least one of apertures 322. In this manner, a user may determine the status of an expansion card connector through an aperture in the computer housing, rather than having to first remove, or partially remove, the computer housing.

Thus, the actuator according to the present disclosure operates both as a device through which power to an expansion card connector can be turned on and off, and a "light pipe" that transmits light from the connector status indicator to a location where it can be viewed from the exterior of the computer housing. In this manner, the need for a second printed circuit board for connector status indicators and/or connector power control devices is eliminated.

Although, the specific embodiment of the actuator shown in FIGS. 3–7 has been discussed thus far, it is to be understood that various configurations may also be employed in accordance with the present disclosure. For example, alternate structures may be employed to movably couple the actuator to the motherboard, so long as movement of the actuator will activate and deactivate power to the associated expansion card connector, and so long as light from the power status indicator is transmitted to a point where it may be viewed from a point external to the computer housing. Thus, it should be understood that various changes, substitutions and alterations can be made hereto without departing from the spirit and scope of the invention as defined by the appended claims.

What is claimed is:

1. A computer system comprising:
   a computer housing;
   a printed circuit board located within said housing, said printed circuit board having at least one connector adapted to receive an expansion card;
   a power control device mounted on said printed circuit board and electrically coupled to said connector for turning on and off power to said connector;
   a divider member positioned within said computer housing substantially adjacent and substantially parallel to said connector;
   an actuator device movably coupled to said divider member, a first end of said actuator being positioned substantially adjacent to said power control device so that when pressure is applied to a second end of said actuator, said actuator moves relative to said divider member to engage and activate said power control device, said actuator further being capable of transmitting light from a first point along a length of said actuator to a second point along said length.

2. The computer system according to claim 1, said computer system further comprising a connector status indicator positioned on said printed circuit board and electrically coupled to said connector, said connector status indicator being capable of illuminating to indicate a status of said connector.

3. The computer system according to claim 2, wherein said first end of said actuator is positioned substantially adjacent to said connector status indicator so that illumination of said connector status indicator illuminates said first end of said actuator.

4. The computer system according to claim 3, wherein said computer housing has an aperture therein, and wherein light transmitted to said second point along the length of said actuator is visible from an external side of said computer housing through said aperture.

5. The computer system according to claim 4, said actuator having a notch therein, and said divider member having a finger-like element projecting therefrom, said finger-like element projecting into said notch.

6. The computer system according to claim 5, said actuator being movable relative to said divider member in a direction toward said power control device, said finger-like element exerting a resistive force on said actuator when pressure is applied to said second end of said actuator to cause it to slidably relative to said divider member, said resistive force being such that when pressure is removed from said second end of said actuator, said actuator returns substantially to its original position.

7. The computer system according to claim 6, said actuator further comprising a first side edge having a curved portion, said curved portion reflecting light from said first point towards said second point.

8. The computer system according to claim 7, said divider member further comprising a first side edge having a curved portion having a contour substantially complementary to and positioned substantially adjacent to said curved portion of said first side edge of said actuator.

9. The computer system according to claim 8, wherein said actuator is comprised of a substantially translucent material.

10. A computer system comprising:
    a computer housing;
    a printed circuit board positioned within said housing, said printed circuit board having at least one connector adapted to receive an expansion card;
    a power control device mounted on said printed circuit board and electrically coupled to said connector for turning on and off power to said connector;
    an actuator device movably coupled to said printed circuit board so that movement of said actuator relative to said printed circuit board activates said power control device, said actuator being capable of transmitting light from a first point along a length of said actuator to a second point along said length.

11. The computer system according to claim 10, further comprising a connector status indicator mounted on said printed circuit board, said connector status indicator being capable of illuminating to indicate a status of said connector.

12. The computer system according to claim 11, wherein when illuminated, light from said connector status indicator is transmitted from said first point along the length of said actuator to said second point along the length of said actuator.

13. The computer system according to claim 12, further comprising a divider member removably coupled to said printed circuit board and positioned substantially adjacent to said connector, said actuator being movably coupled to said divider member.

14. The computer system according to claim 13, wherein a first end of said actuator is positioned substantially adjacent to said power control device and said connector status indicator.

15. The computer system according to claim 14, wherein said computer housing has an aperture therein, and wherein light transmitted to said second point of said actuator is visible from an exterior of said housing through said aperture.

16. An actuator for controlling power to an expansion card connector on a printed circuit board, and for indicating a status of said expansion card connector, said actuator comprising:
    a first end, said first end being of sufficient dimension to extend substantially adjacent to both a power control device mounted on said printed circuit board for controlling power to said connector, and a connector status indicator mounted on said printed circuit board for indicating a status of said connector;
    a second end;
    a first side edge, said first side edge having a curved portion for reflecting light illuminating said first end toward a second point along a length of said actuator; and
    a second side edge, said light transmitted to said second point along the length of said actuator being visible through said second side edge.

17. The actuator according to claim 16, wherein said first side edge has a groove therein, said groove being capable of being slidably engaged with a divider member that is coupled to a printed circuit board and positioned substantially adjacent to said expansion card connector.

18. The actuator according to claim 17, said first side edge having a notch therein for receiving a finger-like projection extending from the divider member that exerts a resistive force on said actuator when said actuator moves relative to said divider member.

19. A method for determining the status of an expansion card connector on a printed circuit board and for controlling power to said expansion card connector, said method comprising the steps of:
    movably coupling an actuator to a printed circuit board within a computer housing of a computer system;
    positioning a first end of said actuator substantially adjacent to a power control device that controls power to said connector, so that movement of said actuator relative to said printed circuit board causes said first end to engage and activate said power control device;
    positioning said first end substantially adjacent to a connector status indicator that emits light to indicate a status of said connector so that light emitted from said connector status indicator illuminates said first end; and
    transmitting at least a portion of said light illuminating said first end of said actuator to a second point along a length of said actuator.

20. The method according to claim 19, further comprising the step of viewing said light transmitted to said second point of said actuator from an exterior of said computer housing through an aperture in said computer housing.

21. The method according to claim 20, wherein said power control device and said connector status indicator are mounted on said printed circuit board.

22. The method according to claim 21, further comprising the steps of:
    positioning a divider member substantially adjacent and substantially parallel to said expansion card connector, and
    movably coupling said actuator to said divider member.

23. The method according to claim 22, wherein said actuator has a notch in a first side edge, and wherein said divider member includes a first side edge and finger-like element that projects therefrom and extends to within said notch, said finger-like element exerting a resistive force on said actuator when pressure is applied to a second end of said actuator to move said actuator relative to said divider member, said resistive force causing said actuator to substantially return to its original position when said pressure is removed from said second end.

24. The method according to claim 23, wherein said first side edge of said actuator has a curved portion, and wherein at least a portion of said light illuminating said first end of said actuator is reflected by said curved portion toward said second point along the length of said actuator.

* * * * *